Patented Sept. 11, 1945

2,384,630

UNITED STATES PATENT OFFICE 2,384,630

ISOMERIZATION OF UNSATURATED NITRILES

John E. Mahan, Bartlesville, Okla., assignor to Phillips Petroleum Company, a corporation of Delaware No Drawing. Application May 13, 1944, Serial No. 535,546

7 Claims. (Cl. 260—464)

This invention relates to the catalytic isomerization of unsaturated nitriles, that is, nitriles of unsaturated acids, in which said isomerizaton involves a shift in the position of an olefinic linkage of the hydrocarbon radical. More specifically, the present invention relates to the vapor-phase treatment of beta,gamma-unsaturated nitriles (2-alkenyl cyanides) in the presence of an alkali or alkaline-earth metal cyanide catalyst whereby conversion of said nitriles to alpha,beta-unsaturated isomers (1-alkenyl cyanides) is accomplished.

In co-pending applications Serial No. 534,161, filed May 4, 1944, and Serial No. 534,162, filed May 4, 1944, of which I am a co-inventor, new methods for the synthesis of unsaturated nitriles by catalytic addition of hydrogen cyanide to conjugated diolefins are described. The predominant reaction in such processes involves 1,4 addition of hydrogen cyanide to the conjugated system, resulting in the production of beta,gamma-unsaturated nitriles (2-alkenyl cyanides). Although such nitriles are valuable in themselves as intermediates for the synthesis of other substances, it is known that in polymerization reactions the alpha,beta isomers (1-alkenyl cyanides) are more valuable, especially when the unsaturated nitriles are to be employed in the manufacture of synthetic resins and rubber.

For the purpose of convenience, the unsaturated nitriles to which the present invention is particularly directed will be referred to as alkenyl cyanides, although reference to them as nitriles of the acid to which they can be hydrolyzed is the present preferred nomenclature. Typical unsaturated nitriles, to which the isomerization process of the present invention is particularly adapted, when referred to as cyanides, are: 2-propenyl cyanide ($CH_2=CH-CH_2-CN$, allyl cyanide, 3-butenenitrile, cyano-2-propene, vinylacetonitrile), 1-propenyl cyanide ($CH_3-CH=CH-CN$, crotonitrile, 2-butenenitrile cyano-1-propene), 2-butenyl cyanide ($CH_3-CH=CH-CH_2-CN$, 3-pentenenitrile, cyano-2-butene, propenylacetonitrile), 1-butenyl cyanide ($CH_3-CH_2-CH=CH-CN$, 2-pentenenitrile, cyano-1-butene), and 2-cyclopentenyl cyanide

cyano-2-cyclopentene). In general, the compounds may be referred to as alkenyl cyanides and include both aliphatic as well as cycloaliphatic unsaturated nitriles. It is to be noted that, in referring to the compounds as alkenyl cyanides or cyanoalkenes, the unsaturation is designated by a different number than is used in referring to them as alkenenitriles.

It is an object of the present invention to provide a process for the isomerization of 2-alkenyl cyanides to the corresponding 1-alkenyl cyanides. Another object of this invention is to provide efficient contact catalysts for effecting the said isomerization.

A further object is to convert 2-alkenyl cyanides to 1-alkenyl cyanides under vapor-phase conditions over solid alkali and alkaline-earth metal cyanides as catalysts.

Laboratory methods for effecting the shift of the double bond of unsaturated nitriles have been described in which the activating catalyst has been an aqueous alkali solution used under liquid-phase reaction conditions. However, such methods have certain well-defined limitations. Thus, it has been reported that 24 hours are required to establish equilibrium conditions at moderate temperatures whereas, at elevated temperatures, saponification of the nitrile becomes a serious factor. Thus, employment of aqueous alkaline catalysts under operative conditions is economically unattractive because of the excessively long reaction period required.

I have discovered that good conversion of unsaturated nitriles to their corresponding isomers can be obtained at equilibrium conditions by operating in the vapor-phase in the presence of certain solid contact catalysts that are specified hereinafter. The conversion is accomplished by vaporizing the unsaturated nitrile and preheating it to the desired reaction temperature. The nitrile vapors are then passed over the solid catalyst at a rate such that equilibrium between the two isomers is established. The effluent is passed through a condenser and the product is then subjected to subsequent fractionation, where feasible, to separate the resulting isomer. The unconverted unsaturated nitrile is then recycled along with fresh feed to the isomerization catalytic zone. In some instances, the boiling points of the two isomers are not sufficiently different to permit separation by fractional distillation. In such cases, a flash distillation may be employed to remove any extraneous polymer and the equilibrium mixture may be utilized in subsequent reactions. Recovery of the less-active isomer can often be carried out at the conclusion of the polymerization or other subsequent reaction in which such mixtures of isomers are utilized.

The catalysts for use in the process of the present invention comprise such materials as alkali and alkaline-earth metal cyanides. More specifically, the cyanides of sodium, potassium, calcium, strontium and barium have been found to be particularly useful as catalysts in the present isomerization reaction. Because of their higher melting points, alkaline-earth metal cyanides are somewhat preferable to alkali metal cyanides. I have found that the most effective catalysts are those comprising a selected cyanide suspended on a solid adsorbent carrier. The said adsorbent carriers may be such materials as activated charcoal, fuller's earth, bauxite, silica gel and the like. A preferred method of catalyst preparation comprises spraying the adsorbent carrier material with an aqueous solution of the cyanide followed by drying to remove water. By alternate application of the cyanide solution to the carrier material and evaporation of water therefrom, desired concentrations of solid cyanides may be applied to the carrier. The finished catalyst, however, must be rendered substantially anhydrous prior to use in the isomerization reaction.

The 2-alkenyl cyanides which may be used in the process of this invention, in general, comprise those prepared by the direct addition of hydrogen cyanide to conjugate diolefins. However, it is obvious that similar compounds from other sources (for example, 2-propenyl cyanide) may be isomerized in accordance with the process. The present invention is particularly directed to unsaturated nitriles from the aliphatic and alicyclic series as well as with mixed aliphatic-alicyclic derivatives. Specific examples of 2-alkenyl cyanides are 2-propenyl cyanide, 2-butenyl cyanide, 2-pentenyl cyanide, 3-methyl-2-butenyl cyanide, 4-methyl-2-butenyl cyanide, 3,4-dimethyl-2-butenyl cyanide, 2-cyclopentenyl cyanide, 2-cyclohexenyl cyanide and homologues of these compounds, both aliphatic as well as cycloaliphatic. Although the conversion of 2-alkenyl cyanides to 1-alkenyl cyanides is normally the desired reaction, it is obvious that the process of the invention is applicable without substantial modification to the reverse reaction, namely, isomerization of 1-alkenyl cyanides to 2-alkenyl cyanides.

Reaction temperatures are selected to meet the individual characteristics of the unsaturated nitrile or cyanide that is to be isomerized. The present isomerization reaction has been found to be of the time-equilibrium type. That is to say, the 2-alkenyl cyanide is gradually converted into the 1-alkenyl cyanide or the 1-alkenyl cyanide is converted into the 2-alkenyl cyanide until the concentration of the respective components reaches equilibrium concentrations at the selected reaction temperature. Generally speaking, low temperatures favor the transition of 2-alkenyl cyanides to 1-alkenyl cyanides. However, in commercial operation, a temperature sufficiently elevated to result in an economical reaction rate must be selected, hence these mutually opposing conditions are so balanced as to give the maximum conversion at economical flow-rates. Thus, I have found in the isomerization of 2-butenyl cyanide (3-pentenenitrile) over a sodium cyanide catalyst, an equilibrium conversion of from 72 to 73 per cent is obtained at 600° F. (approximately 315° C.) in 5 seconds, while a 35 per cent conversion was realized with a contact period of 200 seconds at 400° F. (approximately 205° C.) without ultimate attainment of equilibrium conditions. In most instances, temperatures are selected within the range of approximately 400° to approximately 1000° F. (approximately 200° to approximately 540° C.), with temperatures between approximately 500° and approximately 700° F. (approximately 250° and approximately 375° C.) being preferred.

In order to maintain vapor-phase operating conditions, pressures ranging from subatmospheric to low superatmospheric pressures are employed. In the case of unsaturated nitriles having six or more carbon atoms per molecule, atmospheric to subatmospheric pressures are preferred in order to minimize decomposition reactions. In the case of the lower nitriles, pressures in excess of about 25 pounds per square inch gage are not ordinarily desirable. In many instances, the use of an inert diluent is advantageous.

The flow rate of unsaturated nitrile to the isomerization catalyst is regulated so as to result in a reaction or contact period of from approximately 1 to approximately 20 seconds, with the preferred range being between approximately 2 and approximately 10 seconds.

The following examples will serve to illustrate specific processes of the present invention, but it is to be understood that they do not represent limitations of the invention.

*Example 1*

Allyl cyanide (2-propenyl cyanide) was treated in the presence of a barium cyanide catalyst to give substantial isomerization to 1-propenyl cyanide (crotonitrile). The catalyst comprised approximately 18 per cent by weight of barium cyanide deposited on granular activated charcoal (6 to 14-mesh size) and was contained in a glass tube ½ inch in diameter and 36 inches long. The catalyst was heated to 400° to 450° F. and liquid allyl cyanide was added drop-wise at the top of the vertical tube at a rate of approximately 100 cc. per hour. The effluent was passed through a condenser at the exit end of the catalyst tube. After 500 cc. of allyl cyanide had been treated, the composite effluent was titrated with bromine to determine the extent of conversion to 1-propenyl cyanide. This method of analysis is based on the fact that 1-alkenyl cyanides do not add bromine under titration condition. The analytical data indicated a conversion of 99 per cent of the allyl cyanide to 1-propenyl cyanide. Fractional distillation of the product confirmed the conclusions based on bromine absorption.

*Example 2*

The isomerization of 2-butenyl cyanide (3-pentenenitrile) to 1-butenyl cyanide (2-pentenenitrile) was carried out in the presence of a solid sodium cyanide catalyst. The catalyst composition was prepared by spraying a concentrated aqueous sodium cyanide solution onto granular activated charcoal (6 to 14-mesh size) and drying the catalyst at 600° to 700° F. for several hours. The dry catalyst was disposed in a Pyrex tube 36 inches long and ½ inch in diameter. The catalyst bed was maintained at a temperature level of 575° to 600° F. in a vertical electrically heated furnace during the isomerization reaction. Liquid 3-pentenenitrile was added dropwise at the top of the reaction tube at a rate of about 100 cc. per hour to give a contact time of approximately 5 seconds. Frequent bromine titrations on the condensed effluent indicated a conversion of from 68 to 74 per cent per pass.

In order to confirm the results shown by bromine titration, 158 cc. of total effluent was fractionally distilled through a 15-inch column packed with glass helices. The following data were obtained.

| Fraction | Boiling point | Volume | $n_D^{30}$ | 2-pentenenitrile |
|---|---|---|---|---|
|  | °C. | Cc. |  | Per cent |
| 1 | 121–124.5 | 3.3 |  |  |
| 2 | 124.5–125 | 2.5 | 1.4204 |  |
| 3 | 125–126 | 5.5 | 1.4218 | 95–96 |
| 4 | 126–127.6 | 15.5 | 1.4232 | 95–96 |
| 5 | 127.6–130.0 | 27.0 | 1.4238 | 93 |
| 6 | 130–139 | 19.0 | 1.4250 | 82 |
| 7 | 139–142 | 11.4 | 1.4258 | 62 |
| 8 | 142–143 | 56.0 | 1.4266 | 47 |
| Holdup |  | 14.0 |  |  |

Equilibrium concentrations of 2- and 3-pentenenitriles were realized. This was confirmed by subjecting pure 2-pentenenitrile to the same treatment at 575° to 600° F. Several passes through the catalyst tube resulted in a constant 2-pentenenitrile concentration of 72.4 per cent.

*Example 3*

A catalyst comprising 12 per cent by weight of potassium cyanide supported on fuller's earth was prepared according to the method described in Example 1, and was subsequently used in the conversion of 2-cyclopentenyl cyanide to 1-cyclopentenyl cyanide. The liquid nitrile feed was added at a rate of 150 liquid cc. per hour together with a stream of nitrogen gas equivalent to approximately 5 liters per hour (NTP). The reaction temperature was maintained at 500° to 525° F. throughout the run. Bromine titration of the total effluent indicated a conversion to 1-cyclopentenyl cyanide of 58–60 per cent per pass.

While I have described my invention in detail with the inclusion of certain specific embodiments, no limitations are intended except as defined in the claims.

I claim:

1. A process for the isomerization of a 2-alkenyl cyanide to a 1-alkenyl cyanide which comprises contacting the 2-alkenyl cyanide in the vapor phase with a solid catalyst comprising a substance selected from the group consisting of alkali and alkaline-earth metal cyanides at a temperature within the range of approximately 400° to approximately 1000° F.

2. A process as defined in claim 1 in which the contact time is within the range of approximately 1 to approximately 20 seconds.

3. A process for the isomerization of allyl cyanide to crotonitrile which comprises passing allyl cyanide in the vapor phase at a temperature within the range of approximately 400° to approximately 450° F. over a solid catalyst comprising barium cyanide.

4. A process for the isomerization of 2-butenyl cyanide to 1-butenyl cyanide which comprises passing 2-butenyl cyanide in the vapor phase at a temperature within the range of approximately 575° to approximately 600° F. over a solid catalyst comprising sodium cyanide.

5. A process for the isomerization of 2-cyclopentenyl cyanide to 1-cyclopentenyl cyanide in the vapor phase which comprises passing 2-cyclopentenyl cyanide at a temperature within the range of approximately 500° to 525° C. over a solid catalyst comprising potassium cyanide.

6. A process for the isomerization of a 2-alkenyl cyanide to a 1-alkenyl cyanide which comprises contacting the 2-alkenyl cyanide in the vapor phase at a temperature within the range of approximately 400° to approximately 1000° F. with a solid anhydrous catalyst comprising a substance selected from the group consisting of alkali and alkaline-earth metal cyanides supported on a solid adsorbent carrier.

7. A process for the isomerization of 2-butenyl cyanide to 1-butenyl cyanide which comprises passing 2-butenyl cyanide in the vapor phase at a temperature within the range of approximately 575° to approximately 600° F. over a solid anhydrous catalyst comprising sodium cyanide supported on granular activated charcoal.

JOHN E. MAHAN.